United States Patent [19]
Boone

[11] Patent Number: 5,764,003
[45] Date of Patent: Jun. 9, 1998

[54] DEVICE WITH ENHANCED RELIABILITY FOR THE ELECTRICAL SUPPLY OF A SET OF ELECTRON TUBES

[75] Inventor: Philippe Boone, Rambouillet, France

[73] Assignee: Thomson Tubes Electroniques, Meudon La Foret, France

[21] Appl. No.: 729,285

[22] Filed: Oct. 10, 1996

[30] Foreign Application Priority Data

Nov. 3, 1995 [FR] France .................................. 95 13003

[51] Int. Cl.$^6$ .................................................. H01J 25/00
[52] U.S. Cl. .................................................. 315/9; 315/3.5
[58] Field of Search .................... 315/9, 3.5, 225, 315/337

[56] References Cited

FOREIGN PATENT DOCUMENTS

| 0 260 825 | 3/1988 | European Pat. Off. | |
|---|---|---|---|
| 52-44501 | 4/1977 | Japan | 315/3.5 |
| 55-74044 | 6/1980 | Japan | 315/3.5 |
| 774290 | 5/1957 | United Kingdom | 315/9 |

*Primary Examiner*—Robert Pascal
*Assistant Examiner*—Justin P. Bettendorf
*Attorney, Agent, or Firm*—Oblon, Spivak, McClelland, Maier & Neustadt, P.C.

[57] ABSTRACT

A device for the electrical supply of a set of electron tubes including a main supply source for the parallel supply of at least cathodes and collector electrodes of the electron tubes, first auxiliary supply sources to supply each anode of the electron tubes, second auxiliary supply sources to supply at least a beam-focusing electrode and a heating device of one and the same electron tube, one-way protection elements to protect the main supply source of each of the collector electrodes, cut-off means to insulate the main supply source of each of the cathodes, means for the protection of interaction devices, and devices for the protection of the first auxiliary supply sources.

19 Claims, 4 Drawing Sheets

DEVICE WITH ENHANCED RELIABILITY FOR THE ELECTRICAL SUPPLY OF A SET OF ELECTRON TUBES

BACKGROUND OF THE INVENTION

1. Field of the Invention

The present invention relates to a device with enhanced reliability for the electrical supply of a set of electron tubes.

2. Description of the Prior Art

These tubes may be, for example, travelling-wave tubes applied in satellite telecommunications, where they are associated in large numbers in an amplifier assembly.

In the past, separate supply sources were used to power each of the tubes. When one of the tubes went out of order, the others could continue working. FIG. 1 shows a schematic view of a device for the supply of a set of electron tubes according to the prior art.

It is becoming increasingly necessary in space applications, in order to gain space and reduce weight, to use a single supply source, delivering both high voltages and power, to supply certain high-voltage electrodes of these tubes. These electrodes are in particular the electrodes of the collector which is generally depressed and the cathode electrode. The electrodes of the same nature, of these different tubes, are then parallel-connected.

A parallel assembly of this kind raises problems of reliability for, if an insulation defect occurs in one of the electrodes, the amplifier can no longer function. Reducing weight and increasing compactness entails a loss of reliability that is hardly acceptable in space applications.

SUMMARY OF THE INVENTION

Accordingly, one object of this invention is to provide a novel device for the supply of a set of electron tubes which overcomes drawbacks of prior art devices and which has improved reliability, and is more light weight and compact as compared to prior art devices.

This supply device of the present invention, in particular has protection and cut-off elements in the parallel-supplied electrodes to prevent a situation where the failure of one of the tubes makes the others unusable.

The present invention proposes a device for the electrical supply device of a set of electron tubes, each tube having a gun comprising a cathode designed to emit an electron beam when it is heated by a heating 10 device, a Wehnelt electrode or beam-focusing electrode, an anode for the regulation of the electron beam, one or more electrodes of a collector and a device for the interaction of the electron beam located between the gun and the collector.

The supply device comprises a main supply source designed for the parallel supply of at least the cathodes and the collector electrodes and first distinct auxiliary supply sources, each designed to supply one of the anodes.

It also comprises second auxiliary supply sources that can be activated separately so that each supplies at least the beam-focusing electrode and the heating device of one and the same tube, one-way protection elements to protect the main supply source of each of the collector electrodes, cut-off means to insulate the main supply source of each of the cathodes, means for the protection of all the interaction devices designed to stop at least the main supply source when the total current in the interaction devices is greater than a threshold, devices for the protection of the first auxiliary supply sources in the event of a short circuit bringing one of the anodes into play.

The main supply source may be formed by several elementary supply sources, the cathodes being supplied by one of them and the collector electrodes being supplied by at least another one of them. This variant enables an easier setting of the voltages supplied.

When each of the guns has a second anode used as an ion barrier, the second anodes may each be supplied by one of the second auxiliary supply sources or else by the main supply source. In the later case, a protection device is provided to protect the main supply source of each of the second anodes.

The one-way protection elements are preferably semiconductor elements such as diodes or thyristors.

It is preferable, to further improve reliability, that the semiconductor elements should be associated in a plurality in a parallel assembly.

The cut-off means are preferably relay contacts. The first auxiliary supply sources may be referenced with respect to a potential given by the main supply source or be supplied by the main supply source. This potential is preferably the potential given to the cathodes.

Each second auxiliary supply source is referenced with respect to the cathode potential of the tube that it supplies and, as the case may be, with respect to the ground in the version in which it supplies a second anode.

The devices for the protection of the first auxiliary supply sources and the main supply source may be, for example, resistant elements.

Instead of being resistant elements, the devices for the protection of the first auxiliary supply sources may be relay contacts.

The contacts of the relays associated with one and the same tube may be activated simultaneously.

To reduce the number of components, the relay contacts associated with one and the same tube may belong to a multicontact relay.

A stopping and/or starting of a second auxiliary supply source may activate the opening and/or the closing of the cut-off means connected to the cathode of the tube supplied by said second auxiliary supply source.

A stopping and/or starting of a second auxiliary supply source may activate the stopping and/or starting of the first auxiliary supply source that supplies the same tube as said second source.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DESCRIPTION OF THE PREFERRED EMBODIMENTS

Figure 2:
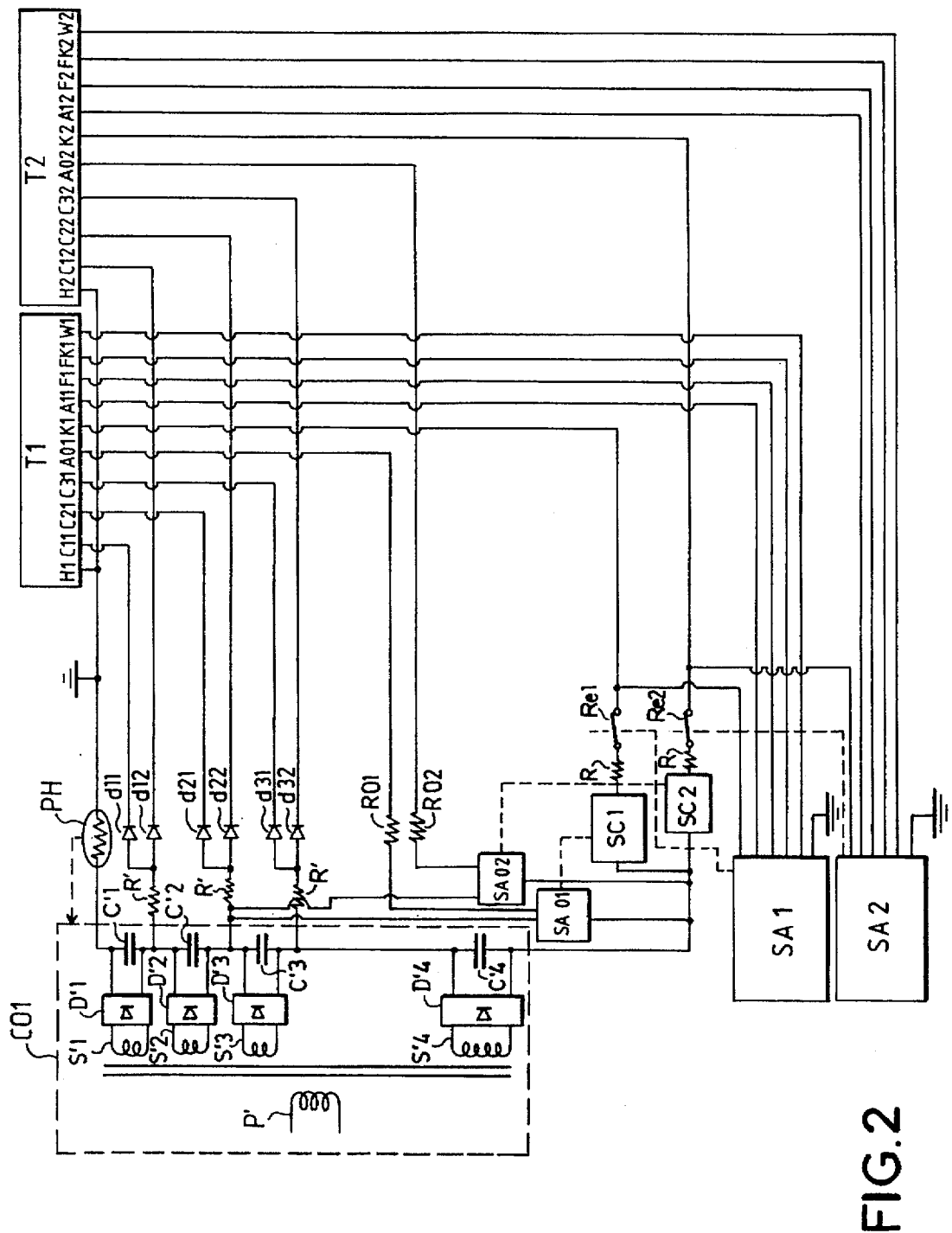
FIG. 2 shows an example of a device for the electrical supply of a set of electron tubes according to the invention.

Referring now to the drawings, wherein like reference numerals designate identical or corresponding parts throughout the several views, and more particularly to FIG. 2 thereof, there is illustrated a conventional electrical supply device for electron tubes T1 and T2, such as traveling wave tubes.

Figure 1:
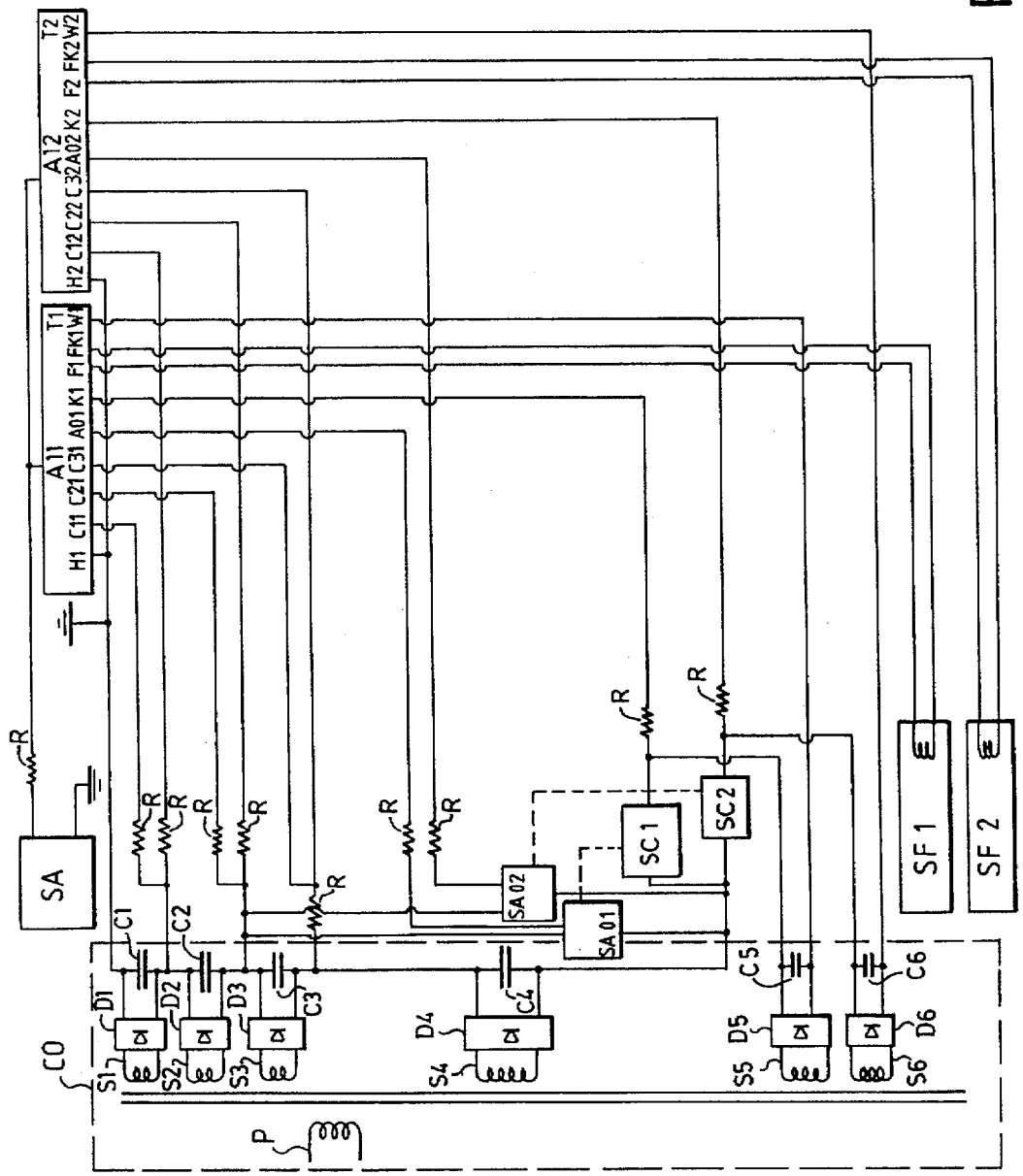
FIG. 1 shows a drawing of a device for the electrical supply of a set of known electron tubes.

In FIG. 1, a travelling-wave tube conventionally has a cathode made of thermo-emissive material heated by a heating device. The cathode is taken to a negative potential of the order of −6000 volts. The cathode is surrounded by a focusing electrode, called a beam-focusing electrode, taken to a potential close to that of the cathode, for example −5 volts with respect to that of the cathode. These two electrodes neighbor a first anode that is used to regulate the current emitted by the cathode and possibly a second anode used as an ion barrier that prevents the ions contained in the tube from reaching the cathode.

The cathode, its heating device, the beam-focusing electrode and the anodes form an electron gun. The anodes and the beam-focusing electrode provided with a central aperture contribute to the bunching of the electrons emitted by the cathode in a long and thin beam. The first anode, which is closest to the cathode, is generally taken to a potential of about +1500 volts with respect to that of the cathode. The second anode, which is furthest away from the cathode, is generally taken to a potential greater than that of an interaction device into which the electrons penetrate after having left the gun.

The interaction device, which is generally formed by a helix in travelling-wave tubes, is connected to ground. After having gone through the interaction device and yielded their energy, the electrons are collected in a collector. This collector has one or more electrodes taken to potentials that decrease with distance from the interaction space. These potentials are lower than the potential of the interaction space but higher than that of the cathode.

When the collector has three successive electrodes, the first one may be taken to about +3000 volts and the last one to about +700 volts with respect to the cathode.

A single main supply source CO delivering both high voltages and power is used to supply certain electrodes 35 of the tubes T1, T2. These are the cathodes K1 and K2, the electrodes C11 and C12, C21 and C22, C31 and C32 of the collector and the beam-focusing electrodes W1, W2. This main supply source CO is a converter made with a transformer having a primary winding P and several secondary windings S1 to S6 giving different voltages. Rectifier means D1 to D6 have their two input terminals each connected to a secondary winding S1 to S6. Capacitors C1 to C6 are mounted between the two output terminals of the rectifying means D1 to D6.

Among the electrodes supplied by the main supply source CO, the cathodes K1 and K2 are parallel-connected and connected to the secondary winding S4.

This is also true for the electrodes of the collectors which are grouped by type. The secondary winding S1 is connected to the electrodes C11 and C12, the secondary winding S2 to the electrodes C21 and C22, the secondary winding S3 to the electrodes C31 and C32.

The two beam-focusing electrodes W1 and W2 are each connected to a different secondary winding, respectively S5 and S6. They receive different voltages.

The helixes H1, H2 are parallel-connected and linked to the ground of the main supply source CO.

The first anodes A01 and A02 are supplied individually, each by a first auxiliary supply source, respectively SA01 and SA02, supplied by the main supply source CO. The potential of the first anodes A01 and A02 is proper to each tube and is a function of the current of the cathode. A current sensor SC1 and SC2 is designed to measure the current of each cathode K1, K2. The voltage given by each first auxiliary supply source SA01, SA02 to the first anodes A01 and A02 is matched with the cathode current measured.

These first auxiliary supply sources SA01, SA02 are subjected to very little load. Their rated current is in the range of some micro-amperes. If there is an insulation defect between one of the first anodes and the ground, the main supply source CO stops immediately under the effect of overconsumption.

A second low-powered auxiliary supply source SA supplies the second anodes A11 and A12 used as ion barriers. The second anodes A11, A12 are parallel-connected.

The heating devices for the cathodes K1 and K2 are mounted between the terminals referenced F1, FK1 for the tube T1 and F2, FK2 for the tube T2. The terminals FK1 and FK2 are connected to the corresponding cathodes K1 and K2. Each heating device is supplied with AC current by a third autonomous auxiliary supply source SF1 and SF2. The sources SF1 and SF2 are controllable. The control of each of the third auxiliary supply sources SF1, SF2 enables the corresponding tube to be put into operation.

If an insulation defect appears in one of the parallel-connected electrodes of one of the tubes, this parallel connection means that it is no longer possible for the tubes, taken as a set, to function.

Low-value resistors, all referenced R, are series-connected between the first anodes A01, A02 and their supply SA01 and SA02, between the second anodes A11, A12 and their supply S1, and between the cathodes K1, K2, the electrodes C11, C21, C31, C12, C22, C32 of the collector and their supply CO1. They protect the supplies in the event of brief electrical discharges in the tubes but cannot permanently maintain poor insulation.

FIG. 2 shows a schematic view of an exemplary device for the electrical supply of a set of electron tubes according to the invention.

As in FIG. 1, the tubes shown and referenced T1, T2 are travelling-wave tubes but it is clear that the supply device according to the invention can be applied to other longitudinal interaction tubes.

As in the prior art, here too there are a main supply source CO1, delivering high voltages and power, to supply at least the cathodes K1, K2 of the tubes T1 and T2 and the electrodes C11 and C12, C21 and C22, C31 and C32 of the collectors. These electrodes, which are grouped together by type, are parallel-supplied. The main supply source CO1 is represented in the same way as FIG. 1 with a primary winding P' and secondary windings S'1 to S'4, rectifier means D'1 to D'4 and capacitors C'1 to C'4.

According to the invention, one-way protection elements d11, d12, d21, d22, d31, d32 protect the main supply source CO1 of each electrode C11, C12, C21, C22, C31, C32 of the collector. These one-way protection elements are preferably semiconductors such as high voltage diodes, for example of the USR.80.A unitrode type. They are series-connected between the supply source CO1 and each collector electrode. The cathode of each of the diodes d11, d12, d21, d22, d31, d32 is connected respectively to an electrode C11, C12, C21, C22, C31, C32 of the collector and the anode to the main supply source CO1. In normal operation, each diode d11, d12, d21, d22, d31, d32 lets through current from the main supply source CO1 to the electrode to which it is connected. If one of the electrodes C11, C12, C21, C22, C31, C32 has an insulation defect with respect to the ground or with respect to another electrode of the same collector, the main supply source CO1 is protected for no current can flow from an electrode to the main supply source CO1. It is never short-circuited. Other semiconductor-based one-way protection elements may be used instead of diodes. These are for example thyristors. It is possible to associate series-connected resistors R' with the diodes d11, d12, d21, d22, d31, d32 to facilitate their switching.

Figure 3:
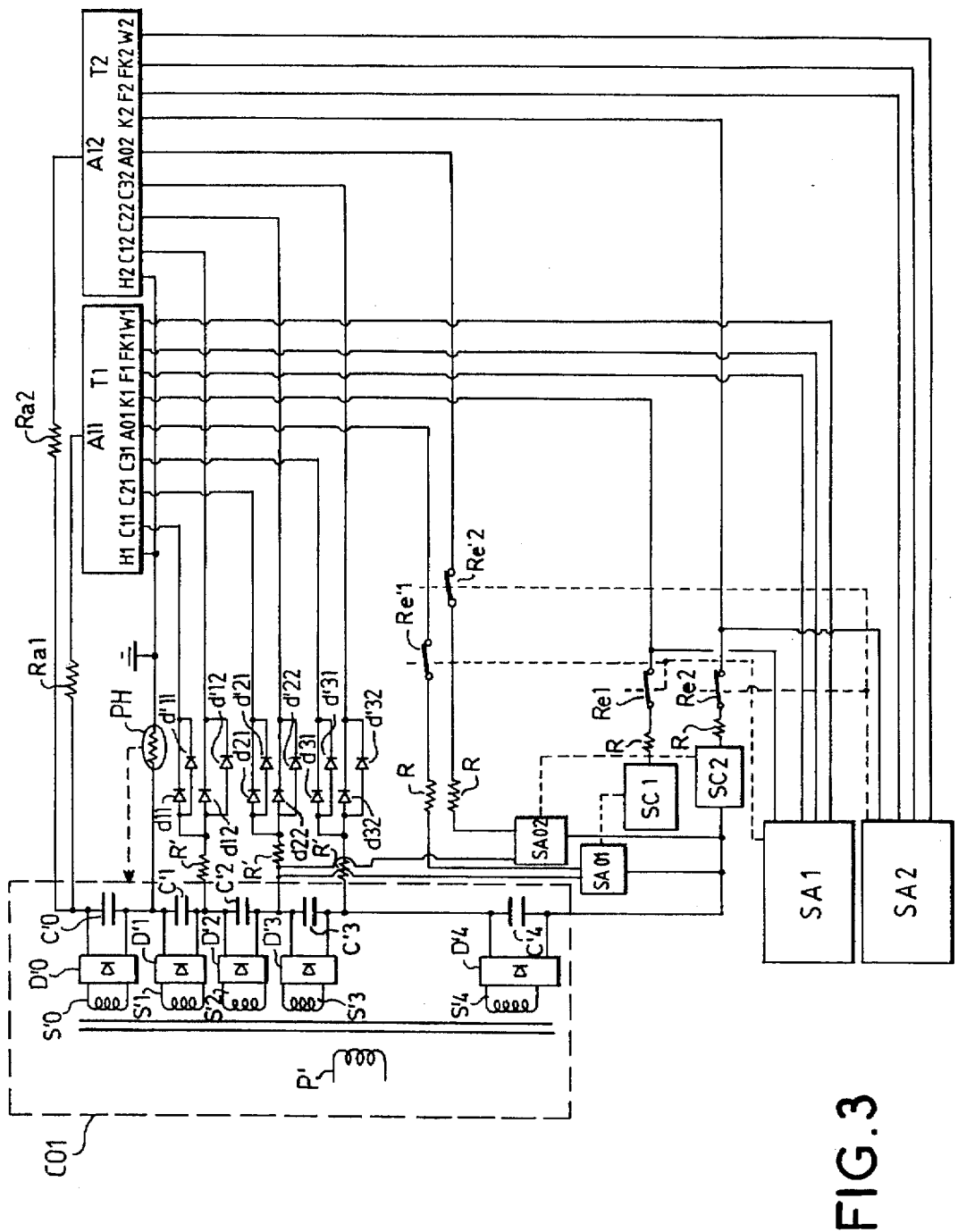
FIG. 3 shows a first variant of a device for the electrical supply of a set of electron tubes according to the invention.

To further improve the reliability of the electrical supply device, instead of using only one diode or only one thyristor per collector electrode, it is possible to use several of them, d11, d'11, d12, d'12, d21, d'21, d22, d'22, d31, d'31, d32, d'32 in a parallel assembly. FIG. 3 shows this variant with two diodes that are parallel-connected in the same direction. If one of the diodes forms an open circuit, the other continues to provide for protection.

Cut-off means are provided to insulate the main supply source CO1 from each cathode K1, K2. These means are shown in the form of a high-voltage relay Re1, Re2 contact mounted between each cathode K1, K2 and the main supply source CO1. The relays Re1, Re2 may, for example, be of the Kilovac HC2 type. In normal operation, the contacts of the relays Re1, Re2 are closed. When a tube has been identified as being defective, the contact of the relay Re1, Re2 corresponding to the defective tube may be opened, by remote control for example in space applications, thus disabling the defective tube so as not to disturb the operation of the other tube.

The first anode A01, A02 for the regulation of current of each of the tubes is supplied as in FIG. 1 by a first auxiliary supply source SA01, SA02 supplied by the main supply source CO1. In the example described, these first auxiliary supply sources receive firstly the potential given to the cathodes and secondly the potential given to the second electrode C21, C22 of the collectors. These first auxiliary sources SA01, SA02 must be capable of withstanding a short circuit between one of the first anodes A01, A02 and the associated cathode K1, K2, the second associated anode A11, A12 or ground. To this end, a protection device is series-connected between each of the first sources SA01, SA02 and the first anode A01, A02. This protection device is shown in the form of a resistive element R01, R02 with an appropriate value. The resistive elements R01, R02 increase the impedance of each of the first auxiliary supply sources. It is advantageous for the protection device to be capable of withstanding permanent operation under short circuit.

Instead of using a resistive element R01, R02 as a protection device, it is possible to use a relay contact as shown in FIG. 3.

The current sensors SC1 and SC2 are also used in the same way as in FIG. 1. They are mounted between the relays Re1, Re2 and the main supply source CO1 in the example of FIG. 2.

Each tube T1, T2 is connected to a second auxiliary supply source SA1, SA2 that supplies at least its heating device F1 and FK1, F2 and FK2 and its beam-focusing electrode W1, W2. These second auxiliary supply sources SA1, SA2 can be controlled separately. They may be deliberately stopped if need be. They may be made, like the main supply source CO1, in the form of a transformer with a primary winding and one or more secondary windings that may or may not be associated with rectifier means. Preferably, especially in space applications, they are protected against excess currents and short circuits.

In the example described, the tubes T1, T2 have a second anode A11, A12 used as an ion barrier and the second anode of each tube is supplied also by this second auxiliary supply source SA1, SA2. Each second auxiliary supply source SA1, SA2 is referenced with respect to the cathode potential of the tube that it supplies and, in this example, with respect to the ground for it also supplies a second anode.

When a tube has an insulation defect, in most cases, this defect leads to a defocusing of the electron beam and hence to a substantial increase in the total helix current. Provision is made for a protection device PH with a total helix excess current associated with a telemetric system in space applications. This protection device PH has a resistive element as a sensor. This resistive element is series-connected between the main supply source CO1 and the helixes H1, H2 which are parallel-connected. An abnormal increase of the total helix current, above a predetermined threshold, triggers a stopping of at least the main supply source CO1. It may be advantageous in space applications for all the supply sources to stop. This prevents the deterioration of the supply sources.

If all the supply sources stop, the state of the tubes is checked tube by tube. For this purpose, one of the second auxiliary supply sources, SA1 for example, and the main supply source CO1 are started up, by remote control in space applications. The working of the supply tube, in this case T1, is checked at least by its helix current and its output power. If the tube T1 is deemed to be defective, it is necessary to insulate it by deliberately stopping its second auxiliary supply source SA1. The contact of the relay Re1 connected to its cathode K1 will be open should the fault detected affect the high voltage insulation of its cathode K1, its beam-focusing electrode W1 and its heating device F1, FK1. If the tube T1 is in working order, then its second auxiliary supply source SA1 is stopped to test another tube T2 for example. The opening of the contact of the relay Re1 is not necessary. When all the tubes have been tested, the tubes in working order may continue to work by the restarting of their second auxiliary supply sources and by the closure, if necessary, of the contacts of the corresponding relays.

In a standard way, the main supply source CO1 is protected against excess consumption of current. This protection, placed at the primary winding P', leads to its stoppage. This is also the case for the second auxiliary supply sources.

Instead of the second anodes A11, A12 of the tubes being supplied by the second auxiliary supply sources SA1, SA2 as shown in FIG. 2, it is possible that the second anodes may be supplied by the main supply source CO1. This variant is shown in FIG. 3.

A secondary winding S'0 has been added to the main supply source CO1. Rectifier means D'0 are connected to it. A capacitor C'0 is mounted at the output terminals of the rectifier means D'0 . The secondary winding S'0 gives a positive voltage with respect to the ground. The second anodes A11 and A12 are each connected to the secondary winding S'0 of the main supply source CO1. A protection device Ra1, Ra2 is inserted between each second anode A11, A12 respectively and the main supply source CO1. This protection device protects the main supply source CO1 when there is an insulation defect in one of the second anodes A11, A12. The protection device may be a resistant element of appropriate value, series-connected between the main supply source CO1 and each of the second anodes A11, A12.

Relay Re'1, Re'2 contacts protect the first auxiliary supply sources SA01, SA02. The contacts of the relays Re'1, Re'2 and Re1, Re2 associated with one and the same tube T1, T2 may be activated simultaneously. They may even belong to a multicontact relay.

Series resistors R are associated with the relays Re'1, Re'2.

Figure 4:
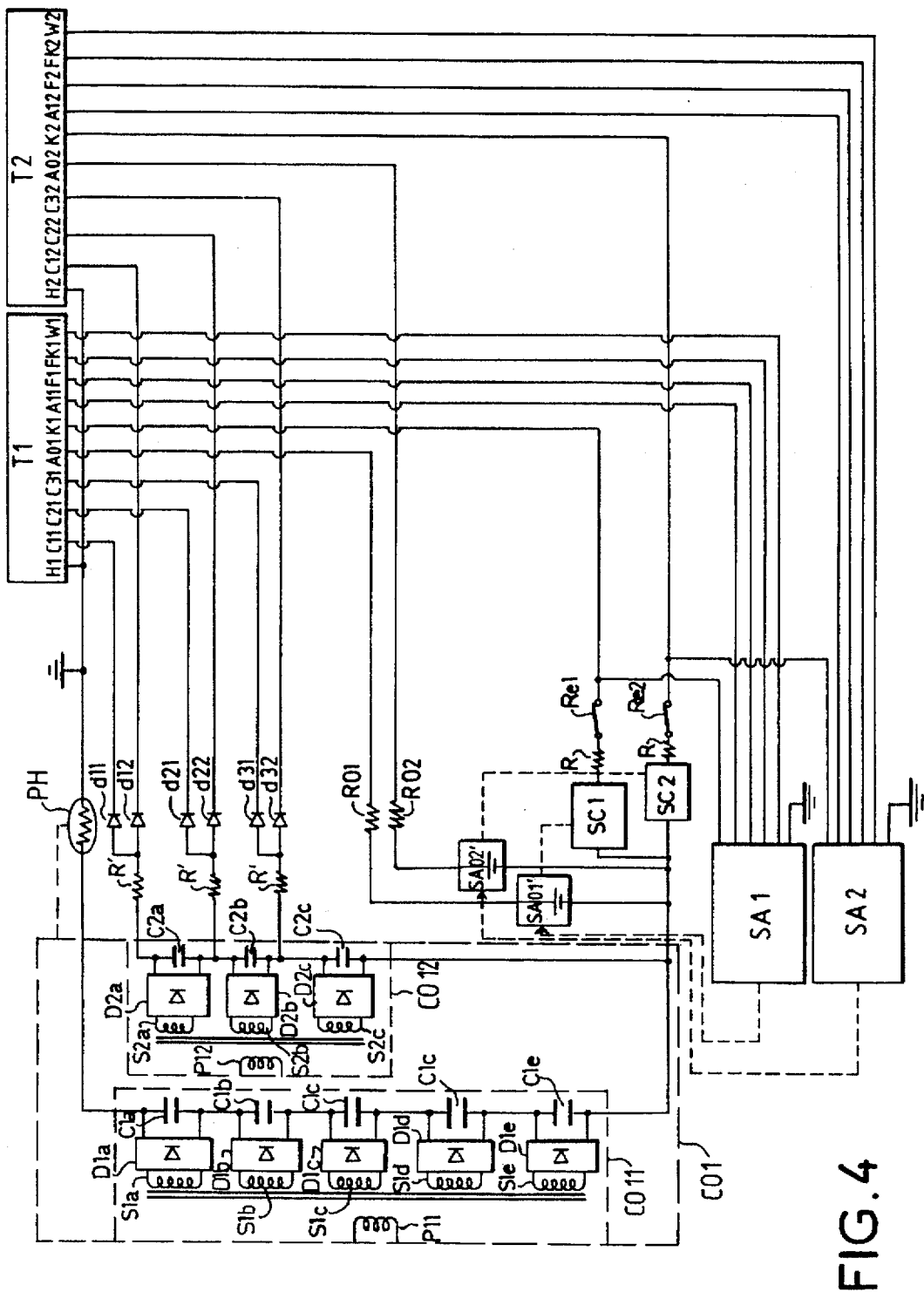
FIG. 4 shows a second variant of a device for the electrical supply of a set of electron tubes according to the invention.

Instead of supplying the first current regulation anodes A01, A02, each being supplied by a first auxiliary supply source SA01, SA02 supplied by the main supply source CO1, it is possible for the first auxiliary supply sources SA01', SA02' to be independent sources referenced with respect to a potential given by the main supply source CO1. This second variant is illustrated in FIG. 4. In the example shown, this potential is the potential given to the cathodes but other choices are possible.

In this configuration, the stopping of one of the second auxiliary supply sources SA1, SA2 may activate the stopping of the first auxiliary supply source SA01', SA02' supplying the same tube. This is also true for the starting of one of the second auxiliary supply sources which controls the starting of the first auxiliary supply source supplying the same tube. For the starting, there is a time-lag device.

Instead of using a single main supply source CO1, it is possible to use a main supply source CO1 formed by several distinct elementary supply sources CO11, CO12 of lower power, to enable an easier setting of the voltages. The cathodes K1, K2 are supplied by a first elementary supply source CO11. The interaction device H1, H2 is connected to this first elementary source CO11.

The collector electrodes C11, C12, C21, C22, C31, C32 are supplied by at least one second elementary supply source CO12.

Each of the elementary supply sources CO11, CO12 has a primary winding, respectively P11, P12, several secondary windings, respectively S1a, S1b, S1c, S1d, S1e and S2a, S2b, S2c, rectifier means respectively D1a, D1b, D1c, D1d, D1e and D2a, D2b, D2c and capacitors respectively C1a, C1b, C1d, C1e, and C2a, C2b, C2c.

Conventionally in FIGS. 2 to 4, resistors all referenced R are series-connected between the main supply source CO1 and the cathodes K1, K2. They have the same role as the resistors of FIG. 1.

The electrical supply device according to the invention is more reliable than those of the prior art for, whatever may be the insulation defect between electrodes or between electrode and ground in one of the tubes, it is possible to insulate the latter without endangering the supply sources and without preventing the operation of the other tubes. The following table gives a general picture of the behavior of a tube supplied by a supply device according to the invention in accordance with that described in FIG. 2, in the event of poor insulation between electrodes.

|    | C1                  | C2                  | C3                  | A0              | K       | A1               | F       | FK      | W       |
|----|---------------------|---------------------|---------------------|-----------------|---------|------------------|---------|---------|---------|
| H  | 1 or 5 2 or 4       | 1 or 5 2 or 4       | 1 or 5 2 or 4       | 1 3 and 4       | 1 4     | 1 3 or 4         | 1 4     | 1 4     | 1 4     |
| C1 |                     | 1 or 5 2 or 4       | 1 or 5 2 or 4       | 6               | 6       | 6                | 6       | 6       | 6       |
| C2 |                     |                     | 1 or 5 2 or 4       | 6               | 6       | 6                | 6       | 6       | 6       |
| C3 |                     |                     |                     | 6               | 6       | 6                | 6       | 6       | 6       |

-continued

|    | C1 | C2 | C3 | A0 | K           | A1              | F               | FK              | W                  |
|----|----|----|----|----|-------------|-----------------|-----------------|-----------------|--------------------|
| A0 |    |    |    |    | 1 or 7 3 or 4 | 1 3 and 4     | 1 or 7 3 and 4  | 1 or 7 3 and 4  | 1 or 7 3 and 4    |
| K  |    |    |    |    |             | 1 4             | 1 4             | 8               | 1 or 9 4          |
| A1 |    |    |    |    |             |                 | 1 4             | 1 4             | 1 4                |
| F  |    |    |    |    |             |                 |                 | 1 4             | 1 or 9 4          |
| FK |    |    |    |    |             |                 |                 |                 | 1 or 9 4          |

Legend:

1: The detection of excess helix current or overconsumption on the main supply source leads to the stoppage of at least the main supply source.

The detection of overconsumption on one of the second auxiliary supply sources leads to the stoppage of at least this source.

2: The protection of the main supply source by the one-way protection means.

3: The protection of the first auxiliary supply sources by the source impedance.

4: The insulation of the defective tube by the deliberate stopping of the second auxiliary supply source which supplies it and the opening of the cut-off means associated with its cathode.

5: Excess power at the primary winding of the main supply source without stoppage.

6: Impossible.

7: Absence of microwave frequency delivered by the tube.

8: No problem.

9: Deterioration of the focusing of the beam.

The following is the contribution of the invention to the reliability of the equipment. According to the international standard, "Reliability prediction of electronic equipment MIL.HDBK.217F", the failure rate of a high-voltage diode of the USR.80.A type is:

$\lambda(\text{diode})=59$ malfunctions/$10^9$ hour giving one probability of malfunction of a diode over 10 years:

$$P1 = 1 - e^{-\lambda T}$$

$$P1 = 5.1671 \cdot 10^{-3}$$

The malfunction rate of two parallel-connected diodes is equal to:

$\lambda(2$ parallel-connected diodes$)=0.3$ malfunctions/$10^9$ hours.

The probability of malfunction of two parallel-mounted diodes becomes:

$$P2 = (5.1671 \cdot 10^{-3})^2.$$

The malfunction rate of the connections of a diode is equal to:

$\lambda(\text{connection of a diode})=0.5$ malfunction/$10^9$ hours.

When it is desired to supply four travelling-wave tubes with three electrodes at the collector and when the means of protection of the main supply source with respect to the collector consist of two parallel-connected diodes per collector electrode, the malfunction rate of the diodes is:

$\lambda$(24 diodes)=0.3×3×4 malfunctions/$10^9$ hours=3.3 malfunctions/$10^9$ hours.

The malfunction rate of the connections of the diodes is equal to:

$\lambda$(connections)=0.5×2×3×4 malfunctions/$10^9$ hours=12 malfunctions/$10^9$ hours.

The malfunction rate of the diodes and their connections is equal to:

$\lambda$(24 diodes+connections)$\approx$16 malfunctions/$10^9$ hours.

The malfunction rate of a Kilovac HC2 type relay is equal to:

$\lambda$(1 relay)=3.15 malfunctions/$10^9$ hours.

The malfunction rate of the two connections of a relay is equal to:

$\lambda$(connections)=1 malfunction/$10^9$ hours.

The malfunction rate of four relays and of their connections is equal to:

$\lambda$(4 relays+connections)$\approx$17 malfunctions/$10^9$ hours.

The malfunction rate of a tube is equal to:

$\lambda$(tube)=337 malfunctions/$10^9$ hours.

The malfunction rate of the supply sources alone is substantially the same in the standard assembly (FIG. 1) and in the assembly according to the invention (FIG. 2). It is equal to:

$\lambda$(supply)=465 malfunctions/$10^9$ hours.

The probability of a malfunction in the standard assembly over 10 years with a malfunctioning tube causing a failure of all four tubes is equal to:

Prob (malfunction of the assembly)=Prob (malfunction of the supplies)+4 Prob (malfunction of a tube)

Prob (malfunction of the assembly)=1 $-e^{-\lambda(supply)T}$+4 $(1-e^{-\lambda(tube)T})$ Prob (malfunction of the assembly)=3.99.$10^{-2}$+4 $(2.91.10^{-2})$=0.156

The probability of a malfunction of the assembly according to the invention over 10 years for a malfunctioning tube is equal to:

Prob (malfunction of the assembly)=Prob (malfunction of the supplies and protection devices)+4 Prob (malfunction of a tube)

Prob (malfunction of the assembly)=1$-e^{-\lambda(supply+diodes+relays+connections)T}$+4$(1-e^{-\lambda(tube)T})$=4.268.$10^{-2}$+4(2.91.$10^{-2}$=0.159

The probability of a malfunction of the assembly according to the invention over 10 years for two malfunctioning tubes is equal to:

Prob (malfunction of the assembly)=Prob (malfunction of the supplies and of the protection systems)+4 Prob (malfunction of a tube)×3 Prob (malfunction of a tube)= 4.268.$10^{-2}$+4(2.91.$10^{-2}$)×3(2.91.$10^{-2}$)=0.0528

The probability of a malfunction of the assembly according to the invention over 10 years for four malfunctioning tubes is equal to:

Prob (malfunction of the assembly)=Prob (malfunction of the supplies and of the protection systems)+4 Prob (malfunction of a tube)×3 Prob (malfunction of a tube)×2 Prob (malfunction of a tube)×Prob (malfunction of a tube) =4.268.$10^{-2}$+4!(2.91.$10^{-2}$)$^4$=0.0427

The supply device according to the invention is more reliable than the one conventionally used. The probability of malfunction over 10 years leading to the loss of one in four channels or to a drop in power of 25% is identical to the probability of total malfunction of this conventional assembly, this malfunction being generated for example by the failure of one of the tubes.

Furthermore, the probability of a malfunction over 10 years leading to the loss of two out of four channels or to a loss of power of 50% is three times smaller than the probability of a total malfunction of the conventional assembly which would be generated for example by the failure of one of the tubes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A device for the electrical supply of a set of electron tubes, each tube including a gun comprising a cathode designed to emit an electron beam when it is heated by a heating device, a beam-focusing electrode, and an anode for the regulation of the electron beam, one or more electrodes of a collector, and a device for the interaction of the electron beam located between the gun and the collector, the supply device comprising:

a main supply source, for the supply of at least the cathodes and the collector electrodes;

first distinct auxiliary supply sources, each designed to supply one anode of a tube, including a second auxiliary supply sources that can be activated separately so that each supplies at least the beam-focusing electrode and the heating device of one and the same tube;

one-way protection elements to protect the main supply source of each of the collector electrodes;

cut-off means to insulate the main supply source of each of the cathodes means for the protection of all the interaction devices designed to stop at least the main supply source when the interaction devices are crossed by a total current that is above a threshold; and devices for the protection of the first auxiliary supply sources in the event of a short circuit.

2. An electrical supply device according to claim 1, wherein the main supply source is formed by several elementary supply sources, and a first elementary supply source supplies the cathodes and at least one second elementary supply source supplies the collector electrodes.

3. An electrical supply device according to claim 1, wherein a stopping or starting of a second auxiliary supply source activates the opening or closing of the cut-off means connected to the cathode of the tube supplied by said second auxiliary supply source.

4. An electrical supply device according to claim 1, wherein each of the guns includes a second anode used as an ion barrier, the second anodes are supplied by the main supply source, and protection devices are provided to protect the main supply source of each of the second anodes.

5. An electrical supply device according to claim 1, wherein the one-way protection elements are semiconductor elements such as diodes or thyristors.

6. An electrical supply device according to claim 5, wherein the semiconductor elements are associated in a plurality in a parallel assembly.

7. An electrical supply device according to claim 1, wherein the devices for the protection of the first auxiliary supply sources and the main supply source are resistive elements.

8. An electrical supply device according to claim 1, wherein each second auxiliary supply source is referenced with respect to the cathode potential of the tube that it supplies.

9. An electrical supply device according to claim 1, wherein the cut-off means are relay contacts.

10. An electrical supply device according to claim 9, wherein the relay contacts associated with one and the same tube belong to a multicontact relay.

11. An electrical supply device according to claim 1, wherein the protection devices of the first auxiliary supply sources are relay contacts.

12. An electrical supply device according to claim 11, wherein the contacts of the relays associated with one and the same tube are activated simultaneously.

13. An electrical supply device according to claim 11, wherein the relay contacts associated with one and the same tube belong to a multicontact relay.

14. An electrical supply device according to claim 1, wherein the first auxiliary supply sources are referenced with respect to a potential provided by the main supply source.

15. An electrical supply device according to claim 14, wherein the potential is the potential provided to the cathodes by the main supply source.

16. An electrical supply device according to claim 14, wherein the first auxiliary supply sources are supplied by the main supply source.

17. An electrical supply device according to one of the claims 1 or 2, wherein each of the guns includes a second anode used as an ion barrier, and the second anodes are each supplied by one of the second auxiliary supply sources.

18. An electrical supply device according to claim 17, wherein the second auxiliary supply sources are referenced with respect to ground when they supply the second anodes.

19. An electrical supply device according to claim 17, wherein a stopping or starting of a second auxiliary supply source activates the stopping or starting of the first auxiliary supply source supplying the same tube as said second source.

* * * * *